(12) United States Patent
Kutsumi (10) Patent No.: US 8,705,862 B2
(45) Date of Patent: Apr. 22, 2014

(54) IMAGE PROCESSING APPARATUS

(75) Inventor: Takeshi Kutsumi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 86 days.

(21) Appl. No.: 13/417,446

(22) Filed: Mar. 12, 2012

(65) Prior Publication Data
US 2012/0269438 A1    Oct. 25, 2012

(30) Foreign Application Priority Data

Apr. 25, 2011   (JP) ................. 2011-097195

(51) Int. Cl.
*G06K 9/00*   (2006.01)
(52) U.S. Cl.
USPC .............. 382/187; 382/171; 382/198
(58) Field of Classification Search
None
See application file for complete search history.

(56) References Cited

U.S. PATENT DOCUMENTS

| | | | |
|---|---|---|---|
| 5,638,466 A * | 6/1997 | Rokusek | 382/290 |
| 6,272,242 B1 * | 8/2001 | Saitoh et al. | 382/187 |
| 7,929,772 B2 * | 4/2011 | Tsai et al. | 382/190 |
| 2006/0018544 A1 * | 1/2006 | Ohguro | 382/181 |
| 2006/0078202 A1 * | 4/2006 | Shilman et al. | 382/186 |
| 2008/0063273 A1 * | 3/2008 | Shimodaira | 382/171 |
| 2010/0115404 A1 * | 5/2010 | Sun et al. | 715/268 |
| 2011/0110599 A1 | 5/2011 | Sata et al. | |

FOREIGN PATENT DOCUMENTS

| | | |
|---|---|---|
| JP | 2-44486 A | 2/1990 |
| JP | 9-106436 A | 4/1997 |
| JP | 10-69520 A | 3/1998 |
| JP | 2011-100356 A | 5/2011 |

* cited by examiner

*Primary Examiner* — Jason M Repko
*Assistant Examiner* — David Perlman
(74) *Attorney, Agent, or Firm* — Birch, Stewart, Kolasch & Birch, LLP (57) ABSTRACT

The object of this invention is to provide an image processing apparatus in which, in processing of a document image read by a document reading device, an inclination of a character string in the document image which is recognized in character recognition is obtained more accurately. The image processing apparatus includes a similar character extraction portion which extracts and outputs a character group comprised of characters having a shape and a size that are same with or similar to each other from among characters constituting a character string comprised of a character recognized in optical character recognition from a document image read by a document reading device; and an inclination calculation portion which calculates an inclination value of the character string based on position information of each character of the character group output from the similar character extraction portion.

1 Claim, 12 Drawing Sheets

| CHARACTER NUMBER | LEFT X | UPPER Y | RIGHT X | LOWER Y | CENTRAL X | CENTRAL Y | SIZE | CHARACTER |
|---|---|---|---|---|---|---|---|---|
| 1 | 110 | 614 | 131 | 588 | 120.5 | 601.0 | 39 | U |
| 2 | 135 | 609 | 148 | 590 | 141.5 | 599.5 | 39 | s |
| 3 | 151 | 611 | 167 | 592 | 159.0 | 601.5 | 39 | e |
| 4 | 171 | 613 | 181 | 594 | 176.0 | 603.5 | 39 | r |
| 5 | 184 | 614 | 197 | 595 | 190.5 | 604.5 | 39 | s |
| 6 | 198 | 624 | 203 | 613 | 200.5 | 618.5 | 39 | , |
| 7 | 218 | 624 | 239 | 599 | 228.5 | 611.5 | 39 | D |
| 8 | 243 | 621 | 260 | 601 | 251.5 | 611.0 | 39 | o |
| 9 | 264 | 623 | 278 | 603 | 271.0 | 613.0 | 39 | c |
| 10 | 281 | 625 | 298 | 605 | 289.5 | 615.0 | 39 | u |
| 11 | 302 | 628 | 330 | 607 | 316.0 | 617.5 | 39 | m |
| 12 | 333 | 630 | 349 | 611 | 341.0 | 620.5 | 39 | e |
| 13 | 354 | 632 | 370 | 612 | 362.0 | 622.0 | 39 | n |
| 14 | 372 | 638 | 385 | 615 | 378.5 | 626.5 | 39 | t |
| 15 | 387 | 635 | 400 | 616 | 393.5 | 625.5 | 39 | s |
| 16 | 404 | 622 | 409 | 617 | 406.5 | 619.5 | 39 | . |

FIG. 10

| CHARACTER NUMBER | LEFT X | UPPER Y | RIGHT X | LOWER Y | CENTRAL X | CENTRAL Y | SIZE | CHARACTER |
|---|---|---|---|---|---|---|---|---|
| 1 | 129 | 422 | 149 | 396 | 139.0 | 409.0 | 39 | U |
| 2 | 154 | 417 | 167 | 397 | 160.5 | 407.0 | 39 | s |
| 3 | 170 | 417 | 186 | 398 | 178.0 | 407.5 | 39 | e |
| 4 | 191 | 418 | 201 | 399 | 196.0 | 408.5 | 39 | r |
| 5 | 203 | 419 | 215 | 399 | 209.0 | 409.0 | 39 | s |
| 6 | 217 | 428 | 223 | 417 | 220.0 | 422.5 | 39 | , |
| 7 | 236 | 393 | 256 | 367 | 246.0 | 380.0 | 39 | D |
| 8 | 259 | 387 | 277 | 368 | 268.0 | 377.5 | 39 | o |
| 9 | 281 | 388 | 295 | 369 | 288.0 | 378.5 | 39 | c |
| 10 | 319 | 390 | 346 | 371 | 332.5 | 380.5 | 39 | u |
| 11 | 350 | 391 | 366 | 372 | 358.0 | 381.5 | 39 | m |
| 12 | 371 | 392 | 387 | 373 | 379.0 | 382.5 | 39 | e |
| 13 | 389 | 397 | 402 | 374 | 395.5 | 385.5 | 39 | n |
| 14 | 404 | 394 | 417 | 374 | 410.5 | 384.0 | 39 | t |
| 15 | 421 | 380 | 426 | 375 | 423.5 | 377.5 | 39 | s |
| 16 | 319 | 390 | 346 | 371 | 332.5 | 380.5 | 39 | . |

FIG. 11

| CHARACTER NUMBER | LEFT X | UPPER Y | RIGHT X | LOWER Y | CENTRAL X | CENTRAL Y | SIZE | CHARACTER |
|---|---|---|---|---|---|---|---|---|
| 1 | 134 | 208 | 156 | 181 | 145.0 | 194.5 | 40 | U |
| 2 | 160 | 205 | 174 | 185 | 167.0 | 195.0 | 40 | s |
| 3 | 176 | 208 | 193 | 188 | 184.5 | 198.0 | 40 | e |
| 4 | 195 | 211 | 206 | 191 | 200.5 | 201.0 | 40 | r |
| 5 | 208 | 214 | 222 | 194 | 215.0 | 204.0 | 40 | s |
| 6 | 222 | 224 | 227 | 213 | 224.5 | 218.5 | 40 | , |
| 7 | 249 | 190 | 271 | 164 | 260.0 | 177.0 | 38 | D |
| 8 | 275 | 188 | 292 | 169 | 283.5 | 178.5 | 38 | o |
| 9 | 295 | 192 | 310 | 173 | 302.5 | 182.5 | 38 | c |
| 10 | 312 | 196 | 330 | 176 | 321.0 | 186.0 | 38 | u |
| 11 | 332 | 201 | 361 | 179 | 346.5 | 190.0 | 38 | m |
| 12 | 364 | 205 | 381 | 186 | 372.5 | 195.5 | 38 | e |
| 13 | 383 | 209 | 401 | 189 | 392.0 | 199.0 | 38 | n |
| 14 | 401 | 216 | 416 | 193 | 408.5 | 204.5 | 38 | t |
| 15 | 416 | 215 | 430 | 195 | 423.0 | 205.0 | 38 | s |
| 16 | 435 | 203 | 439 | 198 | 437.0 | 200.5 | 38 | . |

FIG. 19

IMAGE PROCESSING APPARATUS

CROSS-NOTING PARAGRAPH

This non-provisional application claims priority under 35 U.S.C. §119 (a) on Patent Application No. 2011-097195 filed in JAPAN on Apr. 25, 2011, the entire contents of which are hereby incorporated herein by reference.

FIELD OF THE INVENTION

The present invention relates to an image processing apparatus for obtaining an inclination of a character string in the document image which is recognized in character recognition in processing of a document image read by a document reading device.

BACKGROUND OF THE INVENTION

In recent years, a technique have been known in which a document is read by Optical Character Recognition (OCR) and a translation (hereinafter referred to as a "rubi") of an original text in the document of the read image is given between lines. Japanese Patent Application No. 2009-255373 is a typical document of the technique which was filed by the same applicant as the present application.

Figure 17:
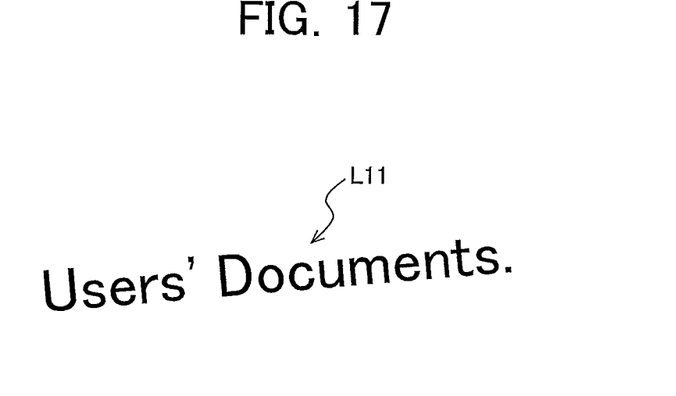
FIG. 17 is a diagram explaining a problem of the present invention.

In such a system for giving a rubi for a document image, for example, as shown in FIG. 17, in order to generate a rubi, even when an original document is slightly inclined to be scanned so that a character string L11 is inclined, or even when there is the inclined character string L11 in the original document, which is inclined along the inclined character string in view of appearance of the rubi, it is necessary to obtain an accurate inclination value of each character string in the document image. The accurate inclination value of a character string is needed also in the processing other than the generation of a rubi.

As a method for obtaining the inclination value, conventionally, for example, among coordinates of a rectangle circumscribing each character in a character string, a lower left coordinate of each rectangle, a central coordinate of each rectangle or the like is determined as a standard, for example, and a regression line is obtained by a character string unit so that an inclination of the line serves as an inclination value of the character string.

Additionally, as a method in which the regression calculation is not used, there is a method in which from coordinates of a first character and a last character in a character string, an inclination between the two characters is obtained, which serves as the inclination value of the above character string.

In the method for obtaining the inclination value of the character string in the document image as described above, there are problems described below.

Figure 18:
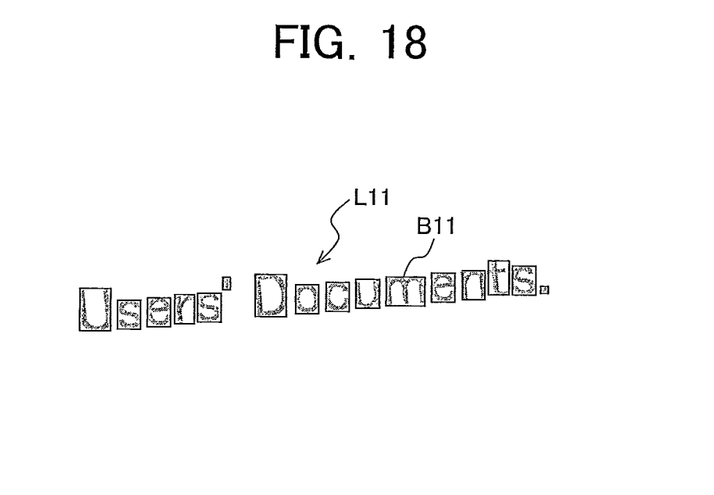
FIG. 18 is a diagram explaining a problem of the present invention.
Figure 19:
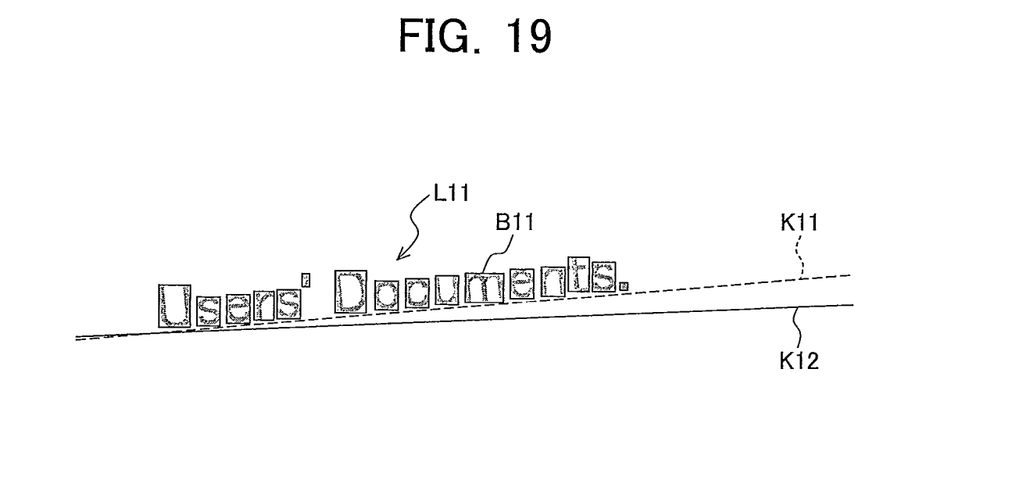
FIG. 19 is a diagram explaining a problem of the present invention.

For example, in a case where all characters in an original document are described in alphabetical characters, as shown in FIG. 18, heights of an upper end and a lower end of a rectangle B11 circumscribing characters are not aligned, and depending on a character arrangement, there may be a case where a true inclination K11 and an obtained inclination K12 are different from each other as shown in FIG. 19 by only performing a regression of these coordinates. In addition, the regression calculation is further required, thus having a large amount of calculation.

Furthermore, in the method of obtaining the inclination of a character string by only the first character and the last character in the character string without the regression calculation, there may be a case where a difference between the true inclination and the obtained inclination becomes larger depending on the first character and the last character.

SUMMARY OF THE INVENTION

An object of the present invention is to provide an image processing apparatus for obtaining, in processing of a document image read by a document reading device, an inclination of a character string in the document image which is recognized in character recognition more accurately.

The object of the present invention is to provide an image processing apparatus comprising: a similar character extraction portion which extracts and outputs a character group comprised of characters having a shape and a size that are identical with or similar to each other from among characters constituting a character string comprised of characters recognized in optical character recognition from a document image read by a document reading device; and an inclination calculation portion which calculates an inclination value of the character string based on position information of each character of the character group output from the similar character extraction portion.

Another object of the present invention is to provide the image processing apparatus, wherein the similar character extraction portion extracts a character group comprised of the largest number of characters from among the characters constituting the character string.

Another object of the present invention is to provide the image processing apparatus, wherein the similar character extraction portion extracts a character group comprised of characters which generally appear at high frequency in a language in the character string.

Another object of the present invention is to provide the image processing apparatus, wherein the similar character extraction portion extracts a character group in which a gap between characters in the character string is more uniform between the character group comprised of the largest number of characters from among the characters constituting the character string and the character group comprised of the characters which generally appear at high frequency in a language in the character string.

Another object of the present invention is to provide the image processing apparatus, wherein the similar character extraction portion outputs a character group comprised of characters excerpted from among the extracted character group.

BRIEF DESCRIPTION OF THE DRAWINGS

FIG. 9 is a table showing an example of a coordinate value of each character after coordinate transformation in the case of FIG. 2, FIG. 4, FIG. 5 or the like;

FIG. 10 is a table showing an example of coordinate values of each character after coordinate transformation in the case of as FIG. 7 or the like;

FIG. 11 is a table showing an example of coordinate values of each character after coordinate transformation in the case of FIG. 8 or the like;

PREFERRED EMBODIMENTS OF THE INVENTION

Figure 1:
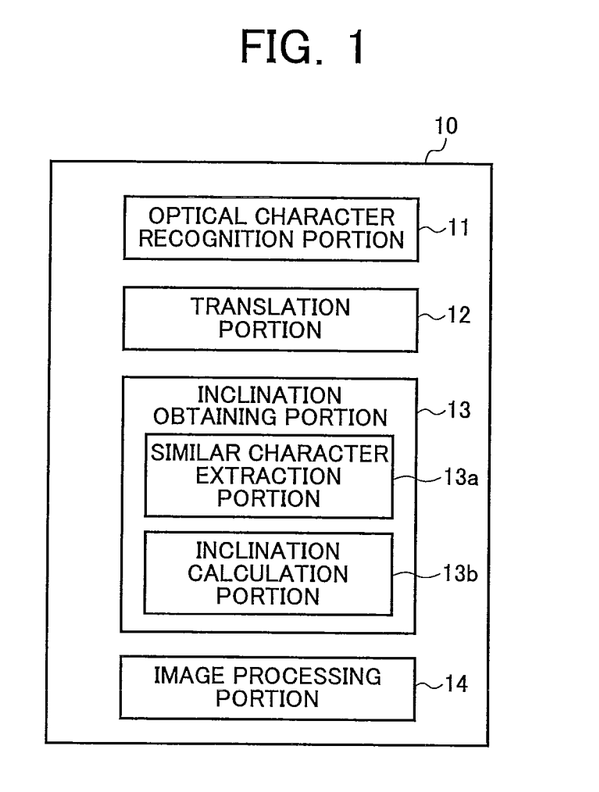
FIG. 1 is a block diagram of an example of an image processing apparatus of the present invention.

FIG. 1 is a block diagram of an example of an image processing apparatus of the present invention.

The image processing apparatus of the present invention includes, as illustrated by a reference numeral 10 in FIG. 1, an optical character recognition portion 11, a translation portion 12, an inclination obtaining portion 13, and an image processing portion 14.

The optical character recognition portion 11 performs optical character recognition processing for document image data in which a document is read by a scanner and obtains a character and coordinate information of the character for each character string as a processing result. Note that, the coordinate information of the character is that an X coordinate is at "a left end of a circumscribing rectangle", "a right end of a circumscribing rectangle", or in "the center of a circumscribing rectangle", or Y coordinate is at "an upper end of a circumscribing rectangle", "a lower end of a circumscribing rectangle", or in "the center of a circumscribing rectangle" and from among which, a uniform standard may be determined. Here, it is assumed that both X and Y coordinates are in "the center of a circumscribing rectangle".

The translation portion 12 translates a character recognized in the optical character recognition portion 11 based on a translation dictionary stored in a not-shown storage portion and creates translation data.

The inclination obtaining portion 13 obtains an inclination value of a character string obtained in the optical character recognition portion 11 for outputting to the image processing portion 14. Description will be given below for a similar character extraction portion 13a and an inclination calculation portion 13b included in the inclination obtaining portion 13.

The image processing portion 14 performs image processing based on information of the character string output from the optical character recognition portion 11, the translation data from the translation portion 12 and the inclination from the inclination obtaining portion 13, and creates image data in which a translation is given along the character string.

The inclination obtaining portion 13 related to a characterizing part of the present image processing apparatus 10 has the similar character extraction portion 13a that extracts and outputs a character group comprised of characters having a shape and a size that are same with or similar to each other from among characters constituting the character string obtained in the optical character recognition portion 11, and the inclination calculation portion 13b that calculates an inclination value of the character string by linear regression, etc. based on position information of the characters of the character group output from the similar character extraction portion 13a.

In this manner, since the image processing apparatus 10 calculates the inclination value of the character string by using only the character group comprised of the same or similar characters constituting the character string, there is no occurrence of a problem due to variation in the shape of a rectangular circumscribing characters, so that an accurate (according to an intended character arrangement) inclination is able to be calculated.

Figure 2:
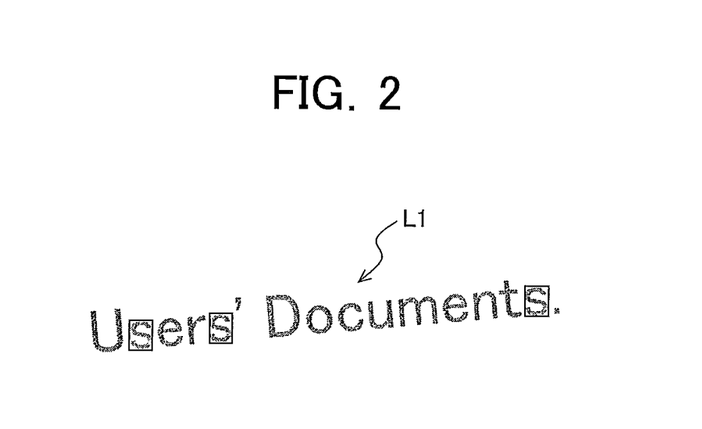
FIG. 2 is a diagram explaining an example of a character group extracted by a similar character extraction portion for calculating an inclination value.

FIG. 2 is a diagram explaining an example of a character group extracted by the similar character extraction portion 13a for calculating an inclination value.

The similar character extraction portion 13a extracts a character group comprised of characters having the shape that is same with or similar to each other from among characters constituting the character string obtained in the optical character recognition portion 11, and more specifically, for example, extracts an actual frequently-appearing character group comprised of the largest number of characters from among the characters constituting the character string obtained in the optical character recognition portion 11.

For example, as shown in FIG. 2, when a character string L1 is "User's Documents.", the similar character extraction portion 13a extracts a character group comprised of two characters of "s".

In the case of calculating an inclination value of the character string based on the character string, only the same characters are used, thus there occurs no problem due to variation in the shapes of the rectangle circumscribing a character, so that an accurate inclination value is able to be calculated.

Figure 3:
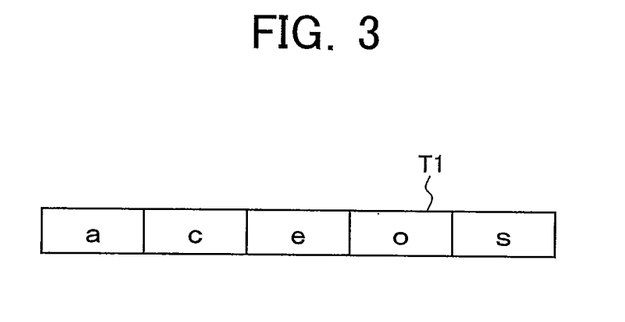
FIG. 3 is a diagram explaining an example of a list of characters which generally appear in a language of a character string at high frequency and have aligned rectangles circumscribing the characters.
Figure 4:
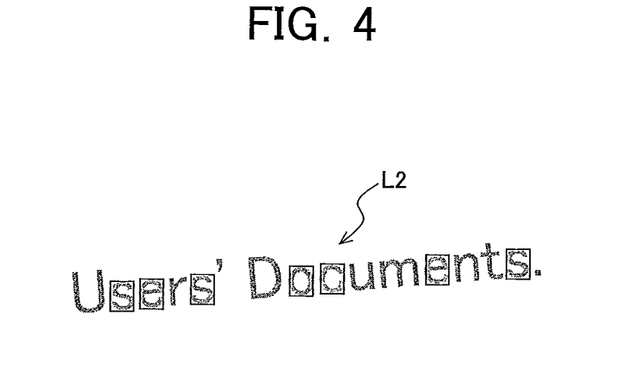
FIG. 4 is a diagram explaining another example of a character group extracted by the similar character extraction portion for calculating an inclination value.

FIG. 3 and FIG. 4 are diagrams explaining another example of the character group extracted by the similar character extraction portion 13a for calculating an inclination value.

In addition to the example of FIG. 2, the similar character extraction portion 13a, for example, judges a type of a language of the character string obtained in the optical character recognition portion 11 based on the translation dictionary, and obtains characters which generally appear in the language at high frequency and have aligned rectangles circumscribing the characters (hereinafter, general frequently-appearing character). Note that, the general frequently-appearing character is, for example, stored for each language as a list in a not-shown storage portion, and in a list T1 of FIG. 3, "a", "c", "e", "o" and "s" which are the general frequently-appearing characters in English are described. The similar character extraction portion 13a then extracts a character group comprised of characters which are the obtained general frequently-appearing characters and comprised of characters constituting the character string recognized in character recognition (general frequently-appearing character group).

For example, as shown in FIG. 4, when a character string L2 is "User's Documents.", the similar character extraction portion 13a judges that the language of the character string L2 is English and extracts the general frequently-appearing character group comprised of "s", "e", "o" and "c" which are the general frequently appearing characters in English and included in the character string L2.

In the case of calculating an inclination value of the character string based on the general frequently appearing character, only the characters in which the size of the rectangle circumscribing the character and an offset amount toward the vertical direction with respect to the traveling direction of the character string are almost the same are used, so that an influence of a problem due to variation in the shape of the rectangles circumscribing the characters is minimized, thereby enabling calculation of an accurate inclination. Further, when a sufficient number of character data is not able to be used for calculating the inclination value of the character string with the method of FIG. 2, the sufficient number of character data may be used in this example.

Further, the similar character extraction portion 13a may once obtain both the general frequently-appearing character group and the actual frequently-appearing character group, and from among which, select and extract the group with less bias in distribution of characters in the character string recognized in character recognition. In this case, a more accurate inclination value is able to be obtained. Description will be given below for a method for judging a bias in distribution.

Figure 5:
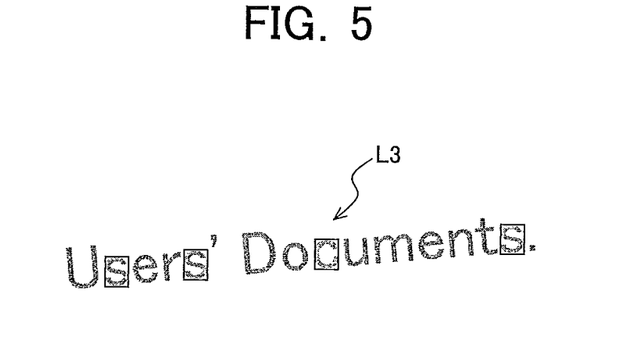
FIG. 5 is a diagram explaining another example of a character group output by the similar character extraction portion for calculating an inclination value.

FIG. 5 is a diagram explaining another example of a character group output by the similar character extraction portion 13a for calculating an inclination value.

The similar character extraction portion 13a may output to the inclination calculation portion 13b all the characters constituting a character group extracted for calculating an inclination value, however, when there are a large number of characters constituting the character group, a part of characters may be excerpted to be output.

For example, concerning the character string, "User's Document.", when the general frequently-appearing character group comprised of a total of seven characters of "s", "e", "o" and "c" (see FIG. 4) are extracted, the similar character extraction portion 13a excerpts a character group comprised of the characters of "s" and "c", as shown in FIG. 5, which are output to the inclination calculation portion 13b. In the inclination calculation portion 13b, based on coordinate information of the excerpted character group, an inclination value of the character string is calculated.

In this method, an appropriate inclination value is able to be obtained in less amount of calculation.

Figure 6:
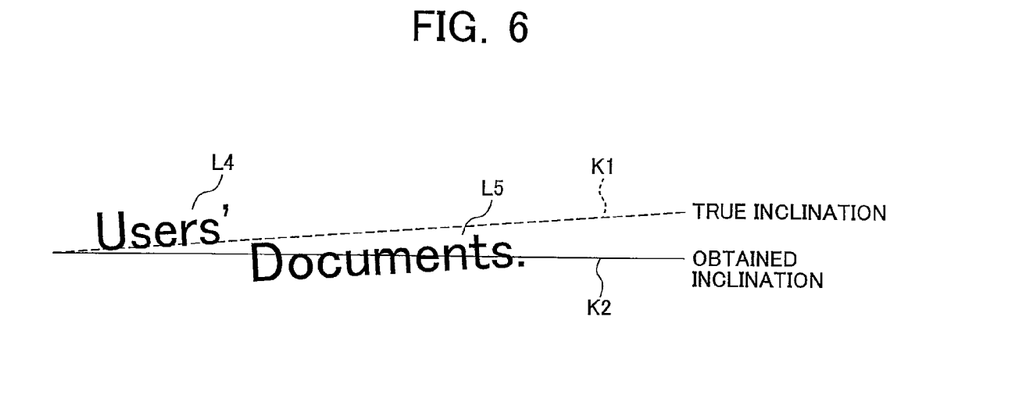
FIG. 6 is a diagram explaining a problem which is able to be solved by a method explained in FIG. 7.

Note that, as shown in FIG. 6, there occurs a case where two character strings L4 and L5 with heights not aligned to each other and adjacent to each other horizontally in an original document are recognized as one character string by the optical character recognition portion 11. In such a case, when an inclination value of the character string is calculated using all the characters in the recognized character string or the first and the last characters as the conventional method, a true inclination K1 is significantly different from a calculated inclination K2.

Figure 7:
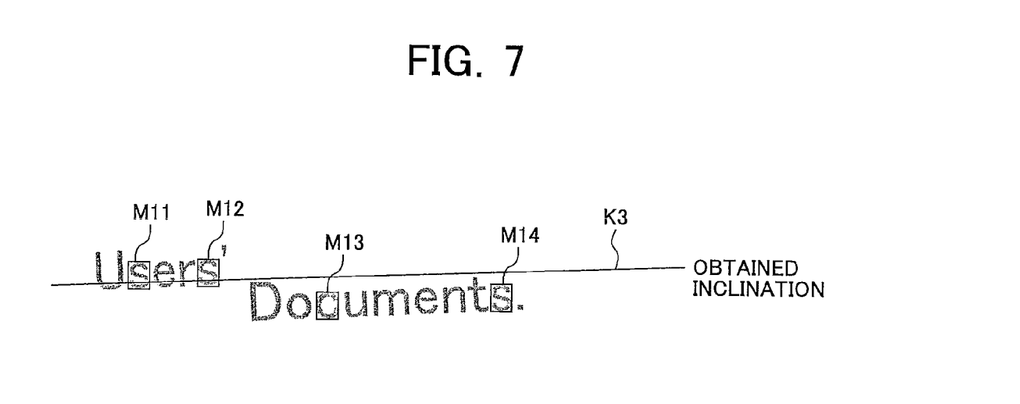
FIG. 7 is a diagram explaining an example of a calculation method of an inclination value in a character string by an inclination calculation portion.

FIG. 7 is a diagram explaining an example of a calculation method of an inclination value in a character string by the inclination calculation portion 13b for solving the above-described problem.

In the case where the two character strings L4 and L5 (see FIG. 6) are recognized as one character string, the inclination calculation portion 13b obtains the character having a combination of coordinates in regard to an inclination increase/decrease direction with the smallest difference from each other from among the character group output from the similar character extraction portion 13a, and calculates an inclination value of the character string based only on the coordinate information concerning the obtained character.

For example, in the case where the character string, "User's Document." is recognized as one character string, as shown in FIG. 7, the inclination calculation portion 13b obtains characters M11 and M12 with a smallest difference between coordinates (Y coordinates) in the vertical direction of a sheet in regard to an inclination increase/decrease direction among the characters, "s" and "c" (characters M11 to M14) output from the similar character extraction portion 13a. Then, the inclination value between the characters of M11 and M12 is calculated as the inclination value of the character string.

Calculation of an inclination value of a character string in such a manner results in an effect described below. That is, in a case where two character strings of L4 and L5 which are not so inclined in an original document image or in reading are recognized as one character string in character recognition, an inclination K3 close to an accurate inclination K1 (see FIG. 6) is able to be calculated in less amount of calculation.

Figure 8:
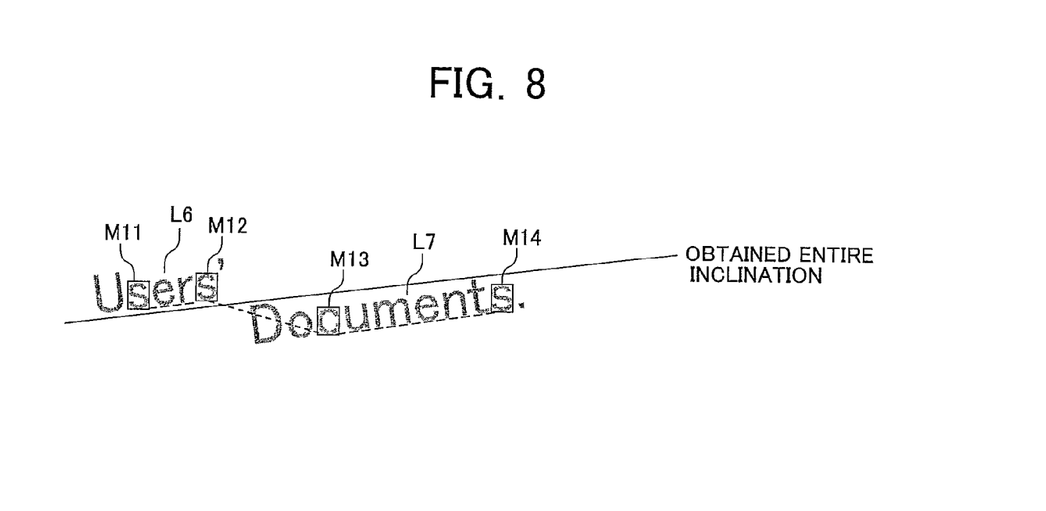
FIG. 8 is a diagram explaining another example of a calculation method of an inclination value in a character string by the inclination calculation portion.

FIG. 8 is a diagram explaining another example of a calculation method of an inclination value in a character string by the inclination calculation portion 13b in a case where two character strings L6 and L7 are recognized as one character string in character recognition.

When the two character strings L6 and L7 are recognized as one character string, the inclination calculation portion 13b obtains an inclination value between all two characters which are adjacent to each other in a character group output from the similar character extraction portion 13a, and calculates an inclination value of the character string from those in which an inclination value as statistically outlier (an inclination value that is significantly different from others) is eliminated in the obtained group of the inclination values between characters.

For example, in the case where the character string, "User's Document." is recognized as one character string as shown in FIG. 8, the inclination calculation portion 13b obtains an inclination value between all the two characters which are adjacent to each other concerning the characters of "s" and "c" (characters M11 to M14) output from the similar character extraction portion 13a. That is, an inclination value between the character M11 and the character M12, an inclination value between the character M12 and the character M13, and an inclination value between the character M13 and the character M14 are obtained. Among the obtained inclinations, the inclination between the character M12 and the character M13 is eliminated because of significantly different outlier from the others, and an inclination value of a character string is calculated based on the inclination between the character M11 and the character M12 and the inclination between the character M13 and the character M14, for example, by averaging thereof.

Calculation of an inclination value of a character string in such a manner results in an effect described below. That is, not only in a case where two character strings which are not inclined in an original document image or in reading are recognized as one character, but also in a case where two character strings L6 and L7 which are inclined in an original document image or in reading are recognized as one character, an accurate inclination value of a character string is able to be calculated.

The inclination calculation portion 13b calculates an inclination value of a character string with a method as described above, however, in the case where a calculated inclination value of a character string is a predetermined value or less, the inclination obtaining portion 13 may output "0" as the inclination value of the character string.

Handling a minor inclination as no inclination in such a manner results in an effect described below. That is, for example, when a rubi of a translation corresponding to an original text or the like is output in a form along with the original text, a problem of a minor inclination being not represented well in an output character string (rubi) depending on resolution of an output medium (for example, a display device, a printer, or those drivers) and thereby unevenly displayed is solved so as to be output neatly. Moreover, the calculation amount at the time of arranging the rubi is able to be reduced. Even in the case of outputting by reproducing the inclination of the original document not the rubi in the present example but text data of an original text, output is similarly performed neatly while the calculation amount is reduced.

Note that, it is assumed that the "inclination value" referred to in the present invention is a ratio of displacement of a Y coordinate (a coordinate in a vertical direction of a sheet) relative to displacement of an X coordinate (a coordinate in a horizontal direction of a sheet) of a virtual straight line along a character string. That is, where an angle of the virtual straight line to the horizontal line is $\theta$, an inclination value is $\tan \theta$. Note that, the "inclination value" may be defined by a method other than this.

Figure 9:
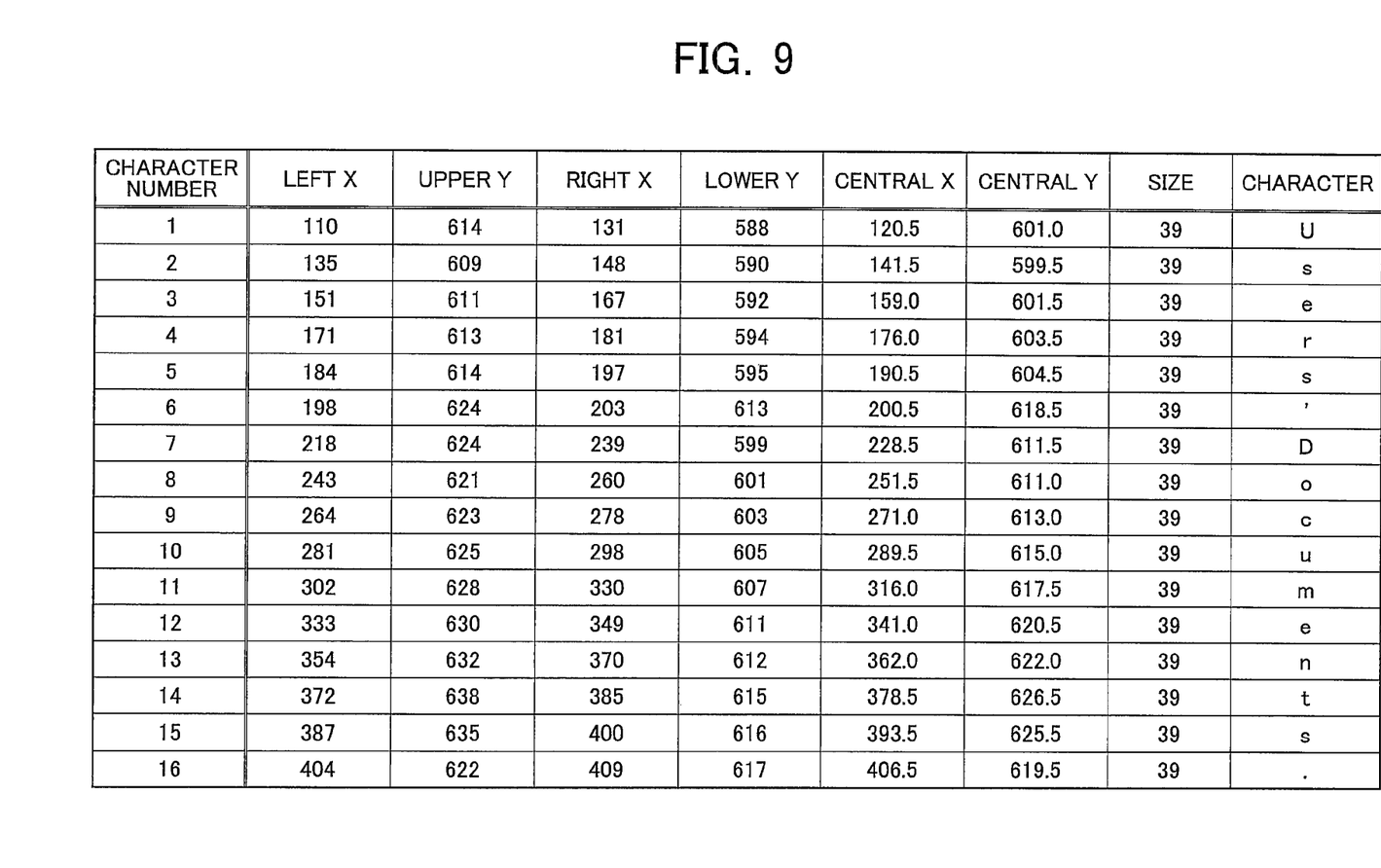
Figure 10:
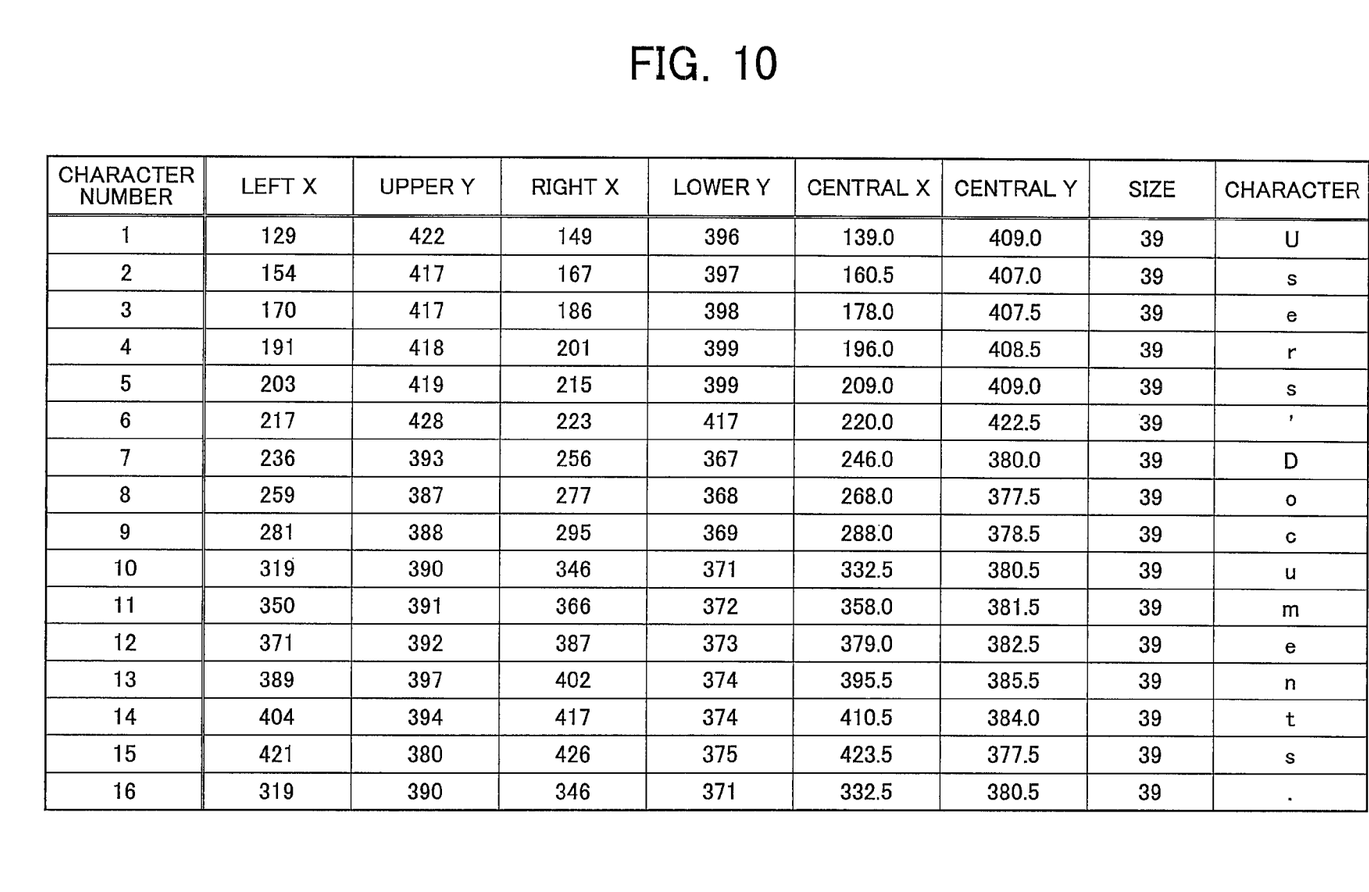
Figure 11:
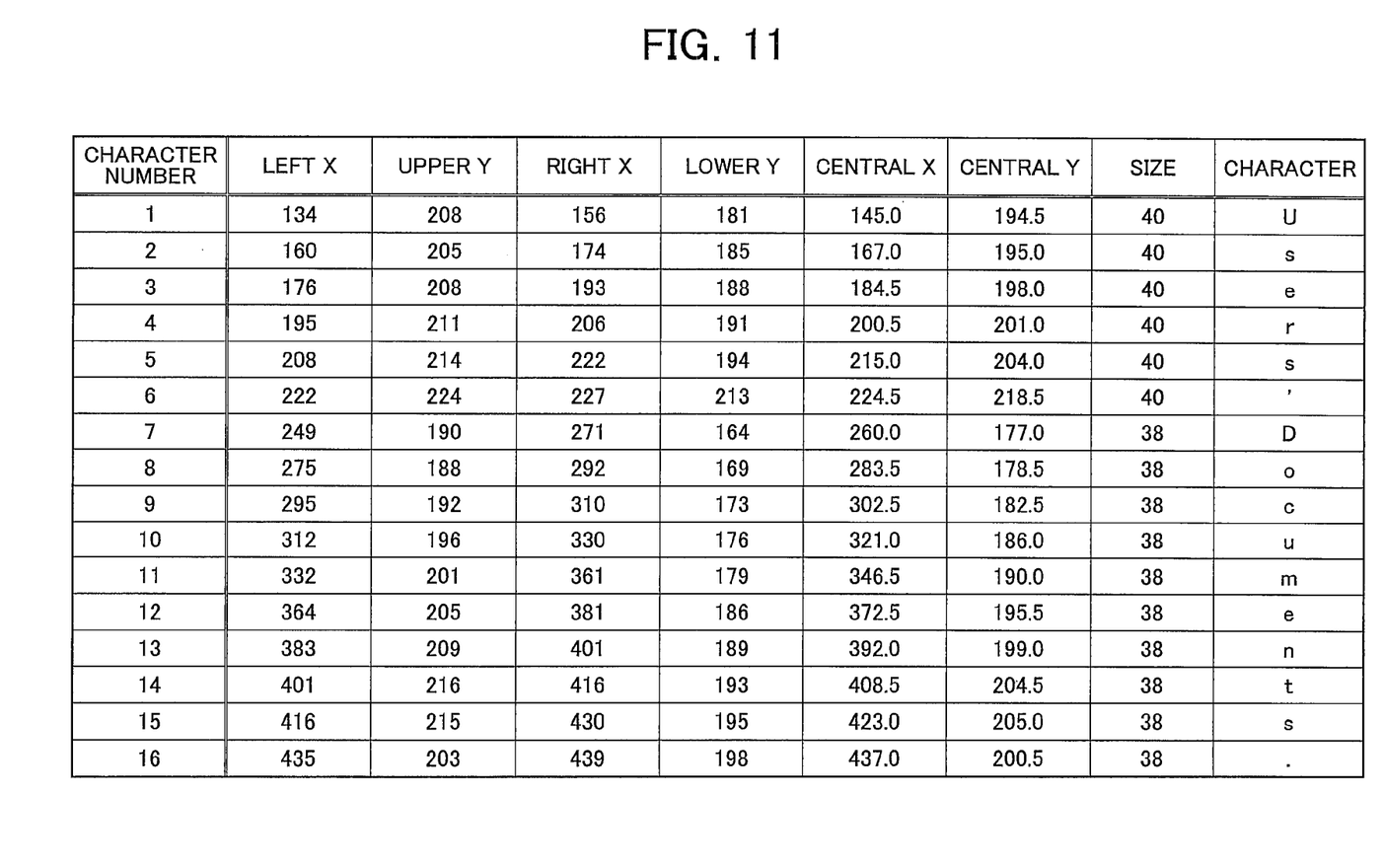

In order that a calculation result in the inclination calculation portion 13b falls within a predetermined range (−45° to +45° to the horizontal direction), the inclination obtaining portion 13 preferably transforms in advance a coordinate system of an entire image or a part thereof including a target character string into a coordinate system in a state of being rotated by 90°, 180° or 270° from the coordinate system. With such configuration, for example, an inclination value of a character string is able to be calculated by a unified method even when an original document is written vertically or horizontally. Further, the coordinate transformation is performed by 90° so that transformation is able to be performed with simple adding and subtracting calculations of coordinate values. FIG. 9 is a table showing an example of coordinate values of a character string after coordinate transformation as shown in FIG. 2, FIG. 4, and FIG. 5, FIG. 10 is a table showing an example of coordinate values of a character string after coordinate transformation as shown in FIG. 7, and FIG. 11 is a table showing an example of coordinate values of a character string after coordinate transformation as shown in FIG. 8.

Figure 12:
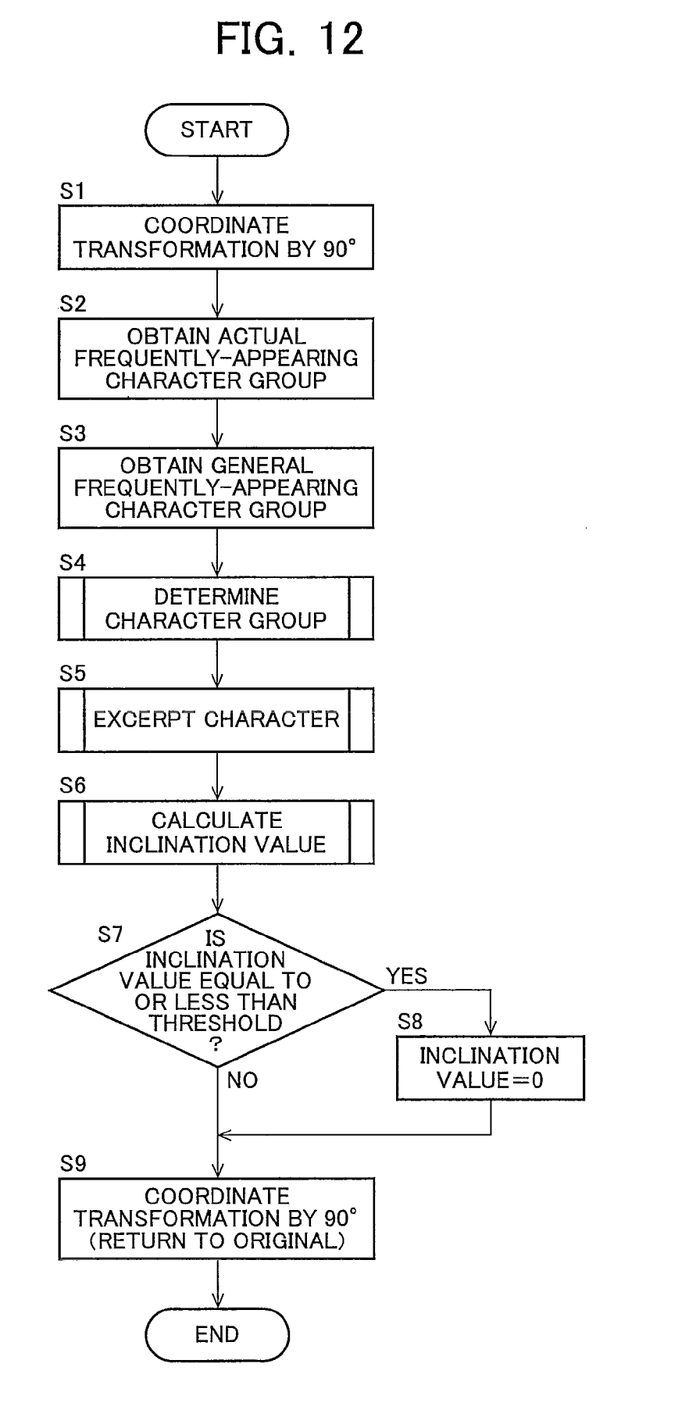
FIG. 12 is a flowchart explaining a processing example of the image processing apparatus of FIG. 1.

FIG. 12 is a flowchart explaining a processing example of the image processing apparatus 10 of FIG. 1.

In the image processing apparatus 10, as illustrated, the optical character recognition portion 11 obtains coordinate information bf a character string and characters constituting the character string, and the inclination obtaining portion 13 then performs coordinate transformation so that the coordinate system of the character string becomes the coordinate system in the state of being rotated by 90°, 180° or 270° from the first (step S1) and obtains the above-described coordinate information again. Thereby, the coordinate values of the character string as shown in FIG. 9 to FIG. 11 are obtained.

The similar character extraction portion 13a then obtains an actual frequently-appearing character group from characters constituting the character string obtained in the optical character recognition portion 11 (step S2). In the example of FIG. 2, for example, three characters of "s", which are the largest in number in the "User's Documents." of the character string L1 are obtained. In FIG. 9, characters of character numbers 2, 5, and 15 are obtained.

Further, the similar character extraction portion 13a obtains the general frequently-appearing character group from characters constituting the character string obtained in the optical character recognition portion 11 (step S3). For example, when there is the list T1 of FIG. 3 for the example of FIG. 5, characters of character numbers 2, 3, 5, 8, 9, 12 and 15 in FIG. 10 are obtained.

At step S4, the similar character extraction portion 13a selects and extracts either the obtained actual frequently-appearing character group or general frequently-appearing character group.

Subsequently, the similar character extraction portion 13a excerpts all or a part of the characters from the selected and extracted character group and outputs the excerpted characters to the inclination calculation portion 13b as a character group (step S5). The inclination calculation portion 13b then calculates an inclination value of a character string (step S6).

Further, the inclination obtaining portion 13 judges whether or not the calculated inclination value of the character string is minor one, namely, a threshold or less (step S7), and in the case of the threshold or more (in the case of NO), the process proceeds to step S9, and in the case of the threshold or less (in the case of YES), the calculated inclination value of the character string is transformed to "0" (step S8), and thereafter the process proceeds to step S9. The threshold is, for example, 0.01. At step S9, coordinate transformation is performed so that the calculated inclination value of the character string is adapted to the coordinate system before the coordinate transformation at step S1.

Figure 13A:
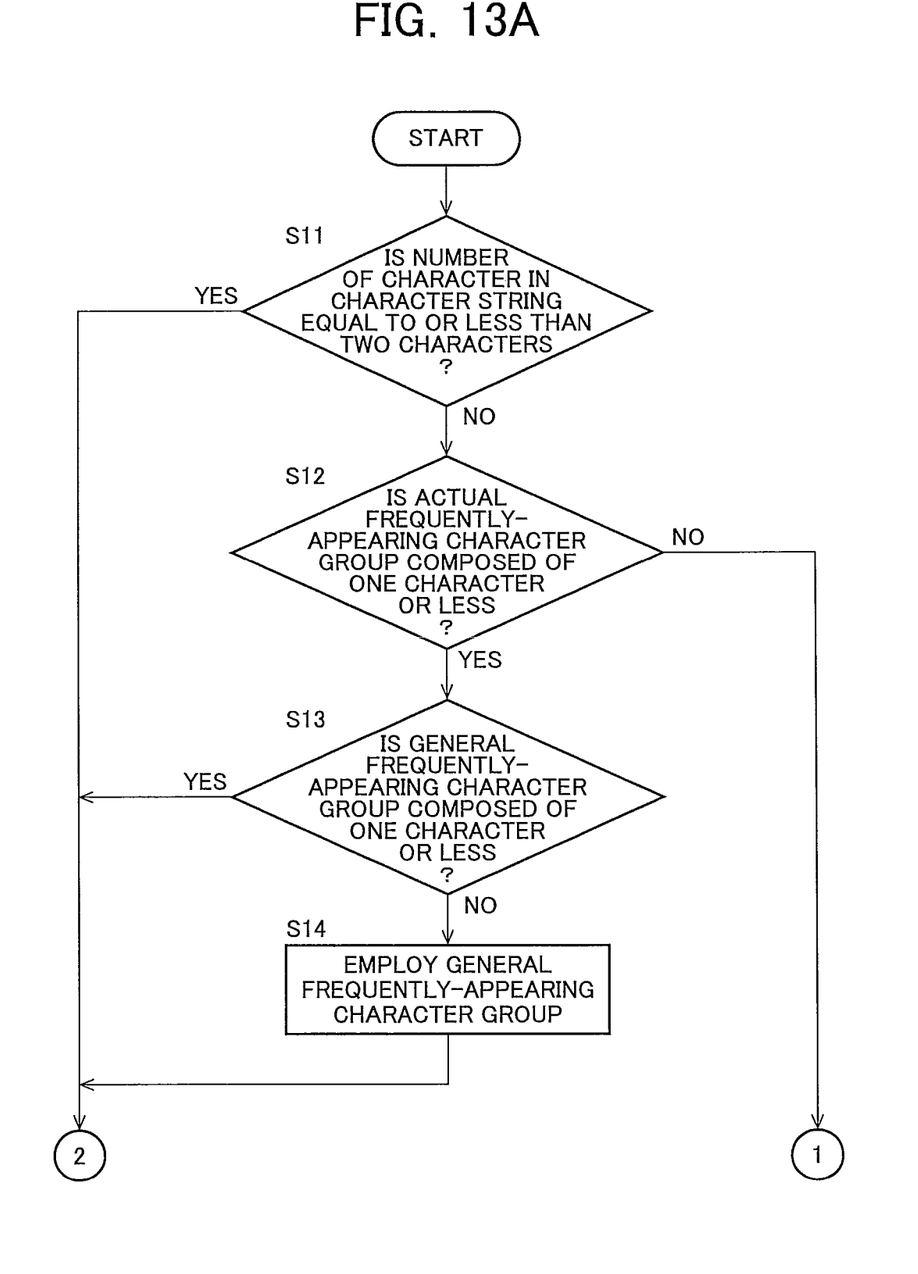
FIGS. 13A and 13B are flowcharts explaining an example of character group selection extraction processing at step S4 of FIG. 12.
Figure 13B:
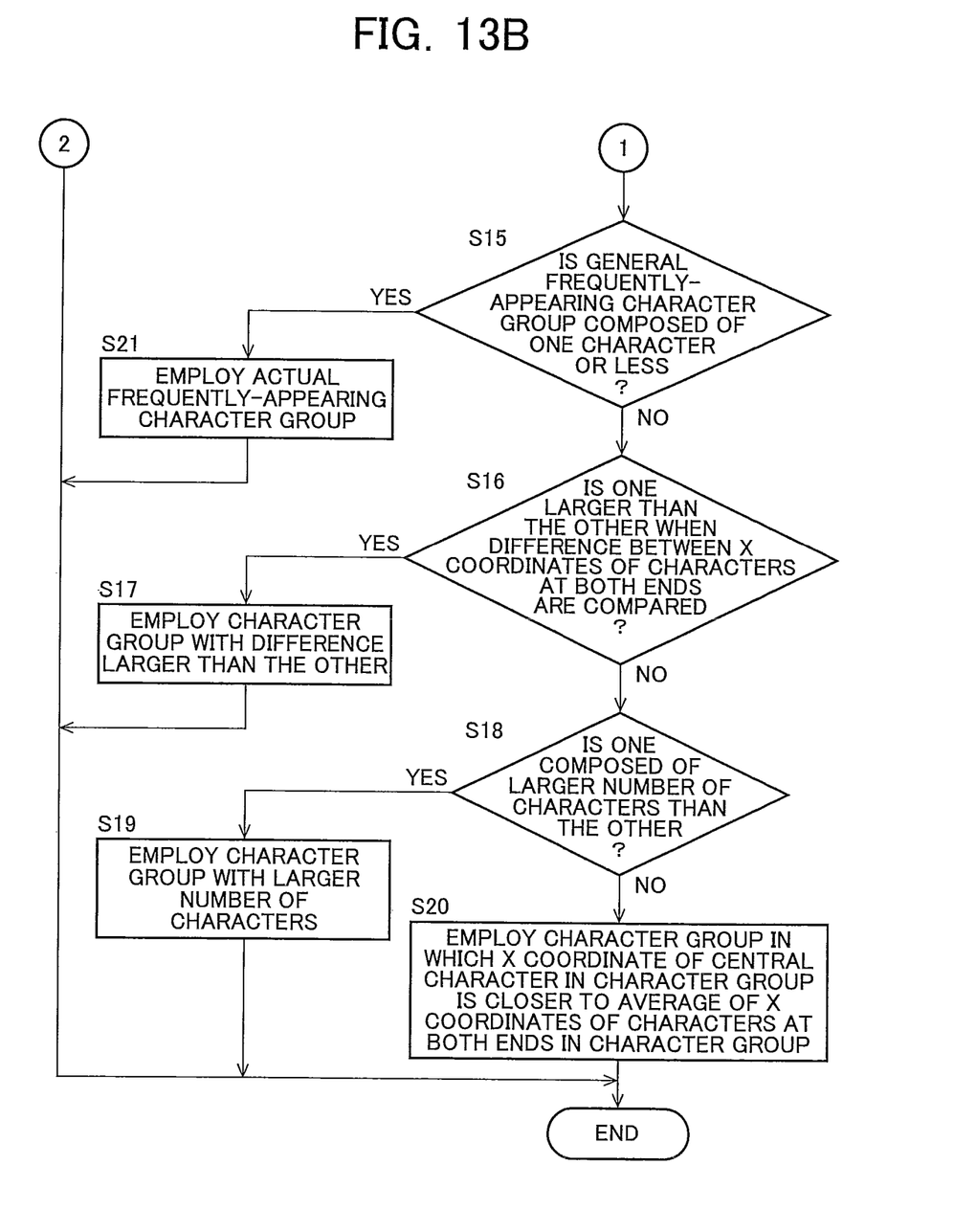

FIGS. 13A and 13B are flowcharts explaining an example of the character group selection extraction processing at step S4 of FIG. 12.

First, the similar character extraction portion 13a determines whether or not a target character string from which an inclination value is obtained is composed of two characters or less (step S11). In the case of two characters or less (in the case of NO), the inclination value of the character string is obtained as the same method as the conventional one, thus the process is finished, and in the case of two characters or more (in the case of YES), determination is made whether or not the actual frequently-appearing character group is composed of one character or less (step S12).

When the actual frequently-appearing character group is composed of one character or less (in the case of YES), determination is made whether or not the general frequently-appearing character group is composed of one character or less (step S13), and in the case of one character or less (in the case of YES), the process is finished, and in the case of two characters or more (in the case of YES), the general frequently-appearing character group is selected and extracted (step S14).

At step S12, in the case where the actual frequently-appearing character group is composed of more than one character (in the case of NO), determination is made whether or not the general frequently-appearing character group is composed of one character or less (step S15), and in the case of one character or less (in the case of YES), the actual frequently-appearing character is selected and extracted (step S21). In the case of more than one character (in the case of NO), the process proceeds to step S16.

At step S16, concerning the actual frequently-appearing character group and the general frequently-appearing character group, determination is made whether or not a distance between characters at both ends in one group is longer than that of the other group, and in the case of being longer (in the case of YES), the longer character group is selected and extracted (step S17). In the case of being shorter (in the case of NO), determination is made whether or not there is a difference in the number of characters between the actual frequently-appearing character group and the general frequently-appearing character group (step S18).

At step S18, when determination is made that there is a difference in the number of characters (in the case of YES), a character group with larger number of characters is selected and extracted (step S19). When there is no difference in the number of characters (in the case of NO), a character group with less bias in a character part, specifically, a character group in which the X coordinate of a central character in a character group (an average of coordinates of two characters in the center when the number of characters in the character group is even number) is closer to an average of the X coordinates of characters at both ends is selected (step S20).

Note that, although a specific description is omitted, in a case where the target character string is composed of two characters, or in a case where the actual frequently-appearing character group is composed of one character and the general frequently-appearing character group is composed of one character or less, by the same method as the conventional one, an inclination value of a character string is calculated based on the coordinate information of all the characters constituting the character string or the characters of both ends.

Figure 14:
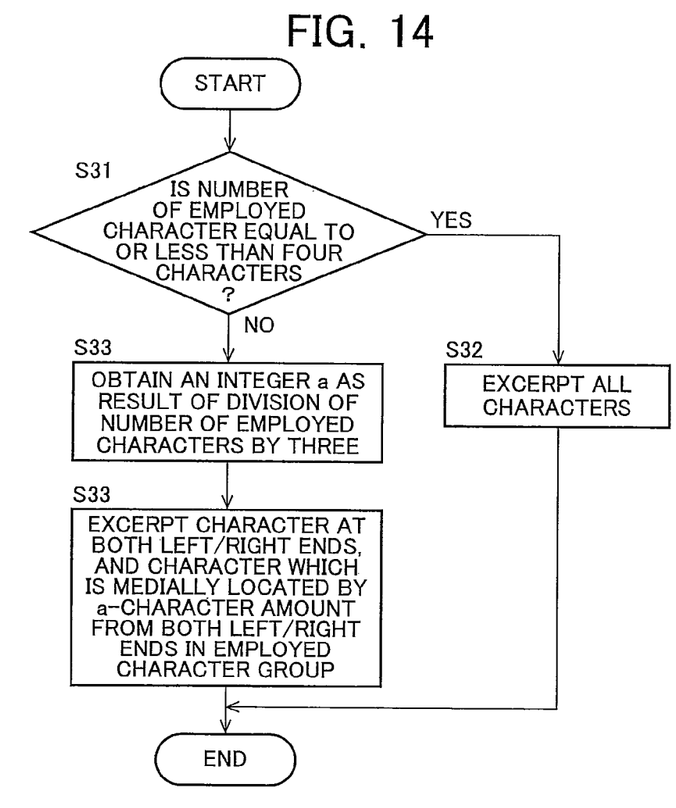
FIG. 14 is a flowchart explaining an example of character excerption processing at step S5 of FIG. 12.

FIG. 14 is a flowchart explaining an example of the character excerption processing at step S5 of FIG. 12. This example is an example in which, when the number of characters in the selected and extracted character group is four or more, four characters are excerpted.

First, the similar character extraction portion 13a determines whether or not the number of characters in the selected and extracted character group is four or less (step S31). In the case of four characters or less (in the case of YES), all the characters are excerpted to be output to the inclination calculation portion 13b as a character group (step S32), and in the case of four characters or more (in the case of NO), an integer a as a result of dividing the number of characters of the selected and extracted group by three is obtained (step S33). Then, in the selected and extracted group, characters at both ends and characters which are medially located by a-character amount from the characters at both ends are excerpted to be output to the inclination calculation portion 13b as a character group (step S34).

Figure 15:
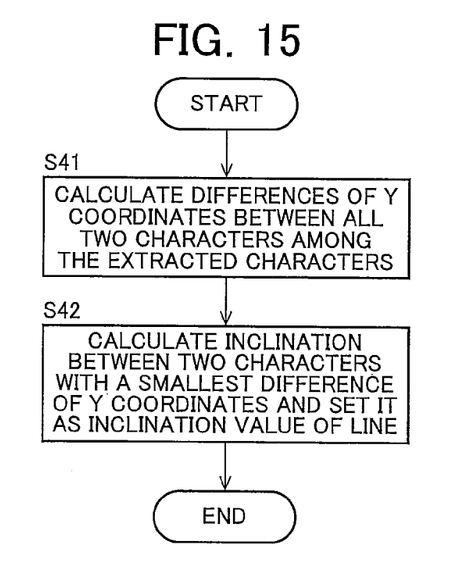
FIG. 15 is a flowchart explaining an example of inclination value calculation processing at step S12 of FIG. 12.

FIG. 15 is a flowchart explaining an example of inclination value calculation processing at step S12 of FIG. 12. Note that, it is assumed here that the character string shown in FIG. 7 and FIG. 10 is input as a character string, and in this case, in the processing up to step S5, characters of character numbers 2, 5, 9, and 15 of FIG. 10 are excerpted.

The inclination calculation portion 13b calculates a difference of Y coordinates between all two characters for the excerpted characters (step S41).

Then, an inclination value between characters with the smallest difference of Y coordinates is calculated as an inclination value of a character string (step S42). In the example of FIG. 10, it is understood that, among the excerpted characters, a difference between the character "s" of the character number 2 and the character "s" of the character number 5 is the smallest as "2.0", and the inclination value between the two characters, (409.0−407.0/209·0−160.5)=0.041 is thus calculated as the inclination value of the character string.

Figure 16:
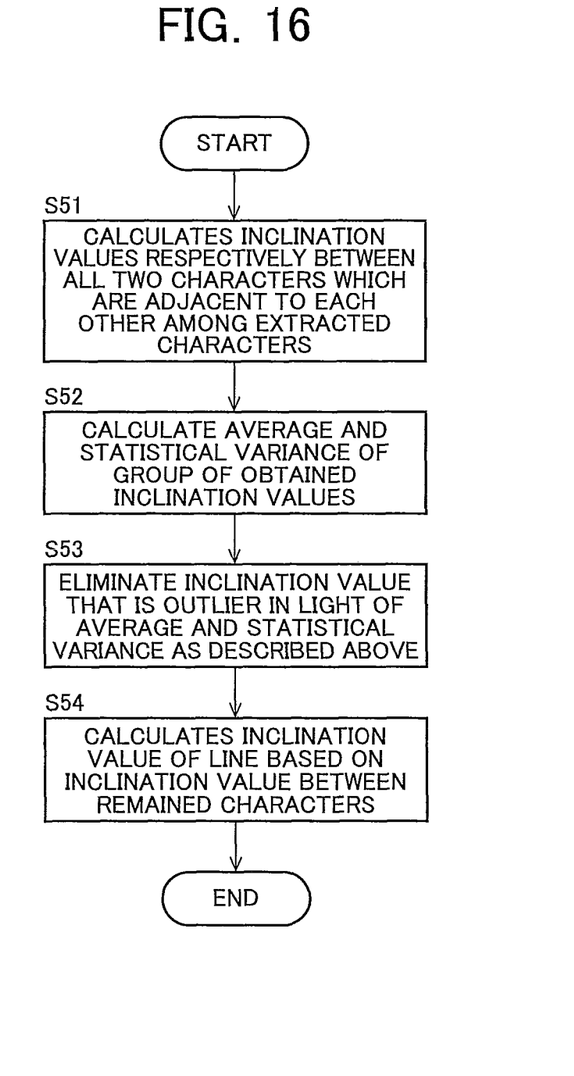
FIG. 16 is a flowchart explaining another example of the inclination value calculation processing at step S12 of FIG. 12.

FIG. 16 is a flowchart explaining another example of the inclination value calculation processing at step S12 of FIG. 12. Note that, it is assumed here that the character string shown in FIG. 7 and FIG. 10 is input as a character string, and in this case, in the processing up to step S5, characters of character numbers 2, 5, 9, and 15 of FIG. 10 are excerpted.

The inclination calculation portion 13b calculates an inclination value between all two characters which are adjacent to each other among the excerpted characters (step S51). In the example of FIG. 10, an inclination value between the character "s" of the character number 2 and the character "s" of the character number 5, an inclination value between the character "s" of the character number 5 and the character "c" of the character number 9, and an inclination value between the character "c" of the character number 9 and the character "s" of the character number 15 are calculated as 0.1875, −0.2458, and 0.1867, respectively.

Subsequently, the inclination calculation portion 13b calculates an average value and statistical variance of the calculated inclination value group (step S52), and eliminates an inclination value that is outlier based on the calculated average value and the statistical variance (step S53). In the example of FIG. 10, the inclination value "−0.2458" is eliminated as the outlier.

The inclination calculation portion 13b then calculates the inclination value of the character string from the remained inclination values between the characters (step S54). For example, in the example of FIG. 10, an average value "0.1871" of the remained inclination values "0.1875" and "0.1867" is calculated as the inclination value of the character string.

Hereinabove, according to the present invention, it is possible to provide an image processing apparatus in which, in processing of a document image read by a document reading device, an inclination of a character string in the document image which is recognized in character recognition is obtained more accurately.

The invention claimed is:
1. An image processing apparatus comprising:
a similar character extraction portion which extracts and outputs a character group comprised of characters having a shape and a size that are identical with or similar to each other from among characters constituting a character string comprised of characters recognized in optical character recognition from a document image read by a document reading device; and
an inclination calculation portion which calculates an inclination value of the character string based on position information of each character of the character group output from the similar character extraction portion,
wherein the similar character extraction portion selects a character group in which a gap between characters in the character string is more uniform between the character group comprised of the largest number of characters from among the characters constituting the character string and the character group comprised of the characters including any one of "a", "c", "e", "o", and "s" appearing in the character string.

* * * * *